May 6, 1930. L. S. HARBER ET AL 1,757,306
DOUGH MOLDING MACHINE
Filed July 23, 1928 3 Sheets-Sheet 1

INVENTORS
LAURENCE SEYMOUR HARBER
AND JOHN EDWARD POINTON
BY *George B. Willcox*
ATTORNEY May 6, 1930.  L. S. HARBER ET AL  1,757,306
DOUGH MOLDING MACHINE
Filed July 23, 1928   3 Sheets-Sheet 3

INVENTORS
LAURENCE SEYMOUR HARBER
AND JOHN EDWARD POINTON
BY George B. Willcox
ATTORNEY

Patented May 6, 1930

1,757,306

UNITED STATES PATENT OFFICE

LAURENCE SEYMOUR HARBER AND JOHN EDWARD POINTON, OF PETERBOROUGH, ENGLAND, ASSIGNORS TO BAKER PERKINS COMPANY INCORPORATED, OF NEW YORK, N. Y.

DOUGH-MOLDING MACHINE

Application filed July 23, 1928, Serial No. 294,779, and in Great Britain August 9, 1927.

This invention relates to dough molding machines in which the desired molding or mechanical working is effected by the coiling or winding of a sheet or slab of dough upon itself by a rotating spindle. The machines to which this invention relates have a plurality of rotating spindles for the said purpose and in addition to a rotary movement said spindles receive reciprocatory and also circular transporting movements. The invention has for its object to increase the efficiency and speed of the dough molding effected by such machines.

The invention comprises constantly rotating multiple spindles carried on a double disc drum with an expansible rotatable annulus between the discs or other means to form an adjustable roller path around and upon or in contact with which the dough coils partake of the circular transporting movement; also a variable speed or other gear for driving said annulus in order to vary the extent of the twisting or like action imparted to the dough during its rotation by the spindles.

The invention further comprises the arrangement with the combination aforesaid of feed rolls in association with a directing and retaining chute between said rolls and the spindles, and also a conveyor and pressure bands on the delivery side of the machine subjecting the coils to a surface rolling action after withdrawal from the spindles.

Referring to the three accompanying sheets of explanatory drawings:—

Like reference letters in the different views indicate like parts.

Figure 1:
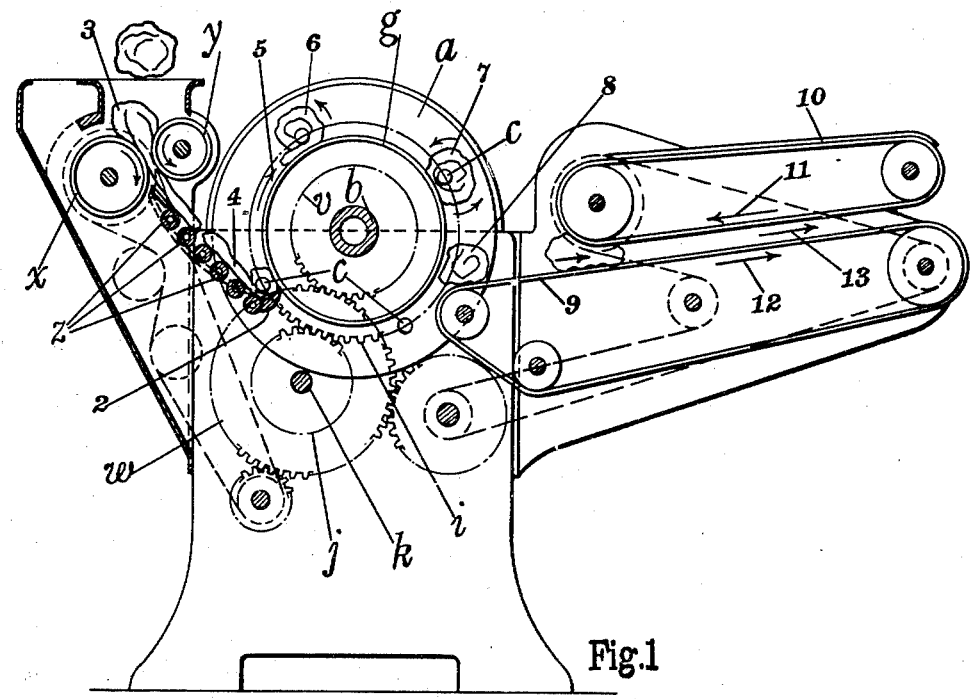
Figure 1 is an end elevation and Figure 2 a plan of a molding machine constructed in accordance with this invention.
Figure 2:
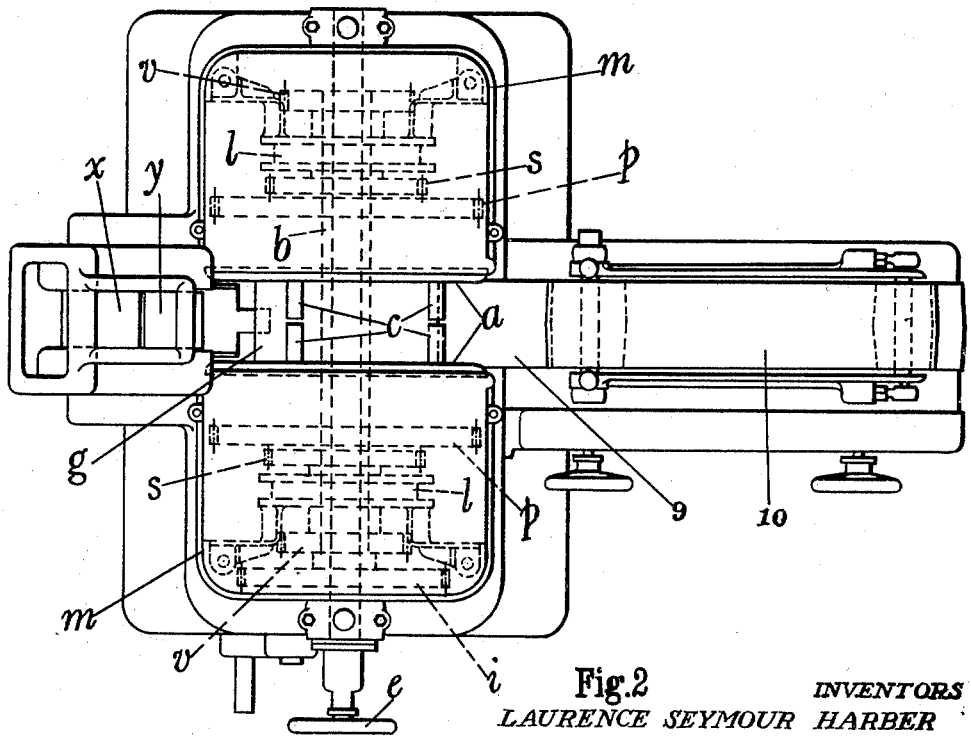

In one form of molding machine in accordance with this invention and as illustrated by the drawings, the two discs $a$ (Figures 1 and 2) forming the spindle drum or carrier are supported on the main or central shaft $b$ of the machine at a sufficient distance apart to accommodate the spindles $c$ carried by both discs when said spindles are projected to the full extent towards each other, as at Figure 2. Each complete spindle for the coiling of a dough piece or slab is made up of two lengths disposed in alignment, one length being supported in the one disc and its other length in the other disc. Ordinarily, four complete spindles as aforesaid (each spindle comprising two lengths) are provided for the one drum or carrier, but the number is fixed or determined to suit requirements. The rotation of the spindles is effected as hereinafter described. In the illustrations at Figures 3 and 4 only one of the discs $a$ is shown.

The central shaft $b$ aforesaid has an axial aperture to receive a non-rotatable rod $d$ which can be adjusted longitudinally by a hand wheel $e$ and screw and nut or equivalent device. At its inner end the said rod $d$ has a coned or tapered extremity $d'$ to engage radially disposed stems as $f$ for varying the effective diameter of the expansible annulus $g$ disposed between the drum or carrier discs $a$ and forming an adjustable roller path with which the coils of dough contact as they rotate and travel around with the spindles $c$. The annulus $g$ consists of a single coil or circle of spring steel with overlapping ends. The diameter of the annulus is set to suit the diameter of the dough coils to be produced and the intensity of the external pressure to be applied thereto. The annulus $g$ (of which the said stems $f$ and their supporting spider $h$ form part) is positively rotated with the central shaft $b$ to which its spider $h$ is secured. Such rotation in the example illustrated, is effected through the gear wheel $i$ fixed on the central shaft $b$ and engaging wheel $j$ on the shaft $k$ of the machine. Or the said drive may be effected through variable speed gear permitting of adjustment of the rate of rotation to suit the extent of the twisting or like action to be imposed by the annulus on the dough coils contacting therewith.

Figure 3:
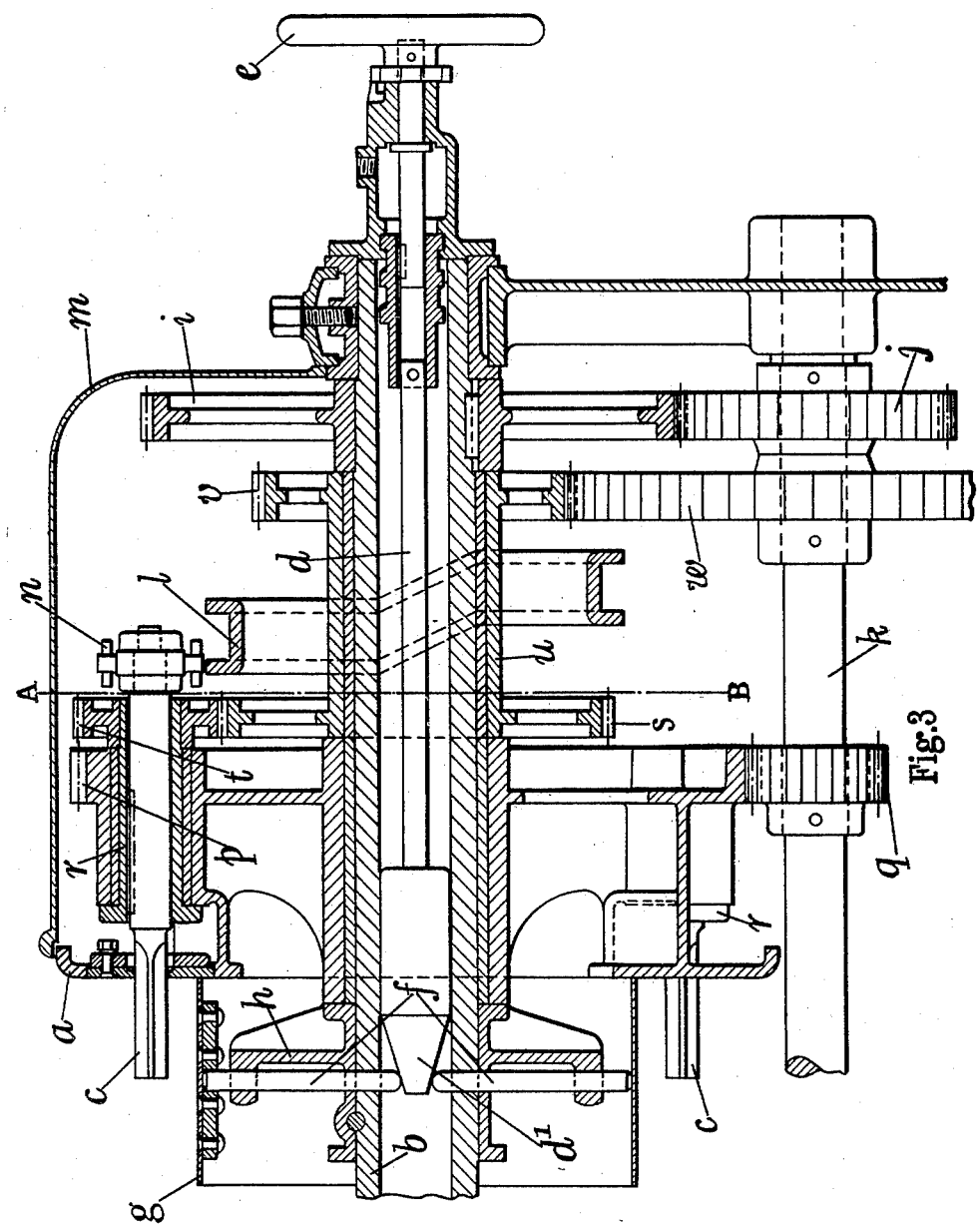
Figure 3 is a sectional side elevation and Figure 4 an end view (half in section on line A, B, Figure 3) illustrating to a larger scale, the spindle drum or carrier and associated parts.
Figure 4:
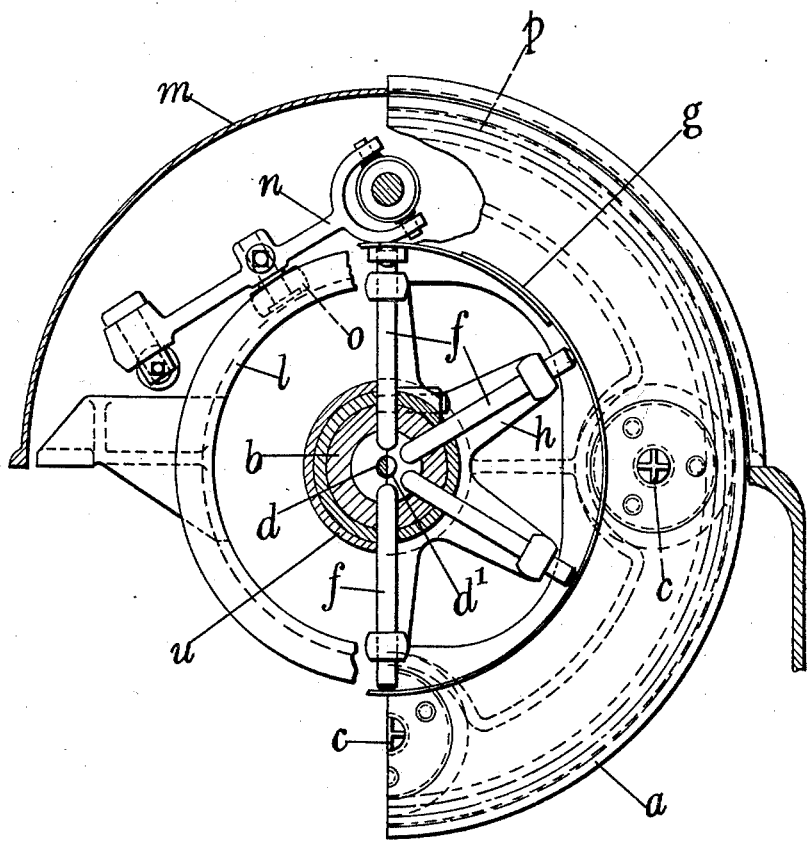

The reciprocatory movements of the spindles $c$ to effect their projection between the carrier discs for the dough coiling operation and their withdrawal from the coils, is obtained preferably by means of an annular cam $l$ affixed to the casing or frame $m$ of the machine and forming an angular path for the rollers of the levers engaging the spindles. The said levers, one of which is shown at $n$ in Figures 3 and 4, are pivotally mounted on end faces of the aforesaid spindle drum or carrier formed by the discs or like parts $a$. Each lever is fitted with a roller as $o$, which, as the lever rotates with said drum rolls around the fixed cam $l$ which thus produces reciprocations of the spindles.

The rotation of the discs $a$ forming the spindle drum or carrier is effected through the engagement of the toothed peripheries $p$ of the discs with the wheels or pinions as $q$ secured on the aforesaid shaft $k$. In the plan view at Figure 2 said peripheries $p$ of both discs $a$ are shown. As Figure 3 shows only one of the discs $a$, only one toothed periphery $p$ appears in that view. The spindles $c$ are each mounted to slide in bearings as $r$ provided in the discs $a$ and they are rotated in such bearings through the spur wheels $s$ engaging the pinions with one of which as $t$ each spindle $c$ is provided. Each of the said spur wheels $s$ is formed with or secured to one end of a sleeve $u$ (Figure 3) rotatably mounted on the main or central shaft $b$ and having at its opposite end a gear wheel $v$ engaging a wheel $w$ secured to the shaft $k$ of the machine.

The dough pieces to be molded are fed between sheeting or slabbing rolls as $x$ and $y$ arranged at one side of the machine. From the delivery side of the said rolls each sheet or slab passes on to a guiding and retaining chute (comprising rollers $z$ and an end abutment 2) in readiness to be picked up by an oncoming spindle $c$ on its arrival in position to engage the forward end of the sheet. Such chute ensures the engagement of each sheet or slab in its turn by a coiling spindle $c$, with the avoidance of any timing device or means of synchronization between the parts, as the dough pieces rest upon the said chute in readiness to be picked up by an oncoming spindle. At Figure 1 of the drawings a dough portion 3 is shown in its passage through the slabbing rolls $x$ and $y$ and following up a previously slabbed portion 4 shown as about to be coiled on one of the aforesaid spindles $c$ which, by the rotation of the discs $a$ (forming the spindle drum) in the direction indicated by the arrow 5, has been brought into position for picking up said portion 4. Dough portions previously picked up and coiled by other of the coiling spindles $c$ are shown at 6 and 7. As the dough portions are rotated by the spindles $c$ and progress with the latter in the direction of the arrow 5, they are also subjected to an additional twisting, stretching or molding action by the independent and positive rotary movement imparted as aforesaid to the annulus $g$ of the spindle carrier.

The completion of the said coiling and molding or mechanical working of the dough portions is effected as they travel from the left hand to the right hand side of the machine as represented at Figure 1. On the withdrawal of the spindles (under the operation of the levers $n$ as hereinbefore described) from the completed dough coils, the latter fall (as at 8) on to a belt or band conveyor 9 arranged in association with the delivery side of the machine and are carried forward thereby into contact with a further band 10 adapted, in association with the first named band or conveyor 9, to exert a surface rolling and compressing action on the coils as they move between and with the bands. The direction of the conveyor movements and of the line of progression of the dough portions between them is indicated by the respective arrows 11, 12 and 13 at Figure 1.

Having thus described our invention what we claim as new and desire to secure by Letters Patent is:—

1. In a dough molding machine a rotatable main shaft, two spaced disks thereon each equipped with a plurality of rotatable and longitudinally slidable dough-coiling spindle members, rotating gears on the spindle members of each disk, a guide cam for imparting sliding movement to each spindle member to project and retract opposed spindle members toward and from each other during rotation, sheeting rolls, a directing chute from the rolls to the spindles, an end abutment for said chute disposed between the paths of travel of the ends of opposed spindle members when retracted, an annulus within the circular path of the spindles and constituting an adjustable track upon which the dough coils on said spindle members partake of circular transporting movement.

2. A machine constructed as described in claim 1 having means for expanding the annulus, comprising radially disposed stems within the annulus, a central adjusting member engaging the inner ends of said stems and means for moving said adjusting member to effect lengthwise movement of said stems.

3. In a dough molding machine, a rotatable main shaft, two spaced disks thereon each equipped with a plurality of rotatable and longitudinally slidable dough-coiling spindle members, driving gears rotating the individual spindle members of each disk, guide means for imparting sliding movement to each spindle member whereby to actuate opposed spindle members toward and from each other during their rotation and revolution, sheeting rolls, a directing chute from the rolls to the spindles, an end abutment for said chute between the paths of travel of the ends of opposed spindle members when retracted, an annular track within the circular path of the spindles, upon which track the dough coils on said spindle members partake of circular transporting movement.

4. In a dough piece molding machine including coiling spindles mounted for axial rotation and for revolution in a circular path simultaneously, an annular track disposed within the path of revolution of the spindles, said track constituting a way upon which dough coils while on the spindles partake of circular transporting movement.

5. In a dough molding machine including coiling spindles mounted to revolve about a central axis, an expansible annular track within the path of revolution of said spindles.

6. A structure as set forth in claim 4 wherein the annular track is mounted for rotation about its axis simultaneously with the rotation and revolution of the coiling spindles, whereby the dough pieces on the spindles are subjected to twisting, stretching and molding action by such independent and positive rotary movement of said annulus.

7. A structure as set forth in claim 4 wherein the annular track is mounted for rotation about its axis independently of the rotation of the coiling spindles and is also adjustable radially and circumferentially.

In testimony whereof we have signed our names to this specification.

LAURENCE SEYMOUR HARBER.
JOHN EDWARD POINTON.